Sept. 9, 1958 P. J. H. JANSSEN 2,851,524
AUTOMATIC GAIN CONTROL FOR TELEVISION RECEIVERS
Filed March 28, 1955
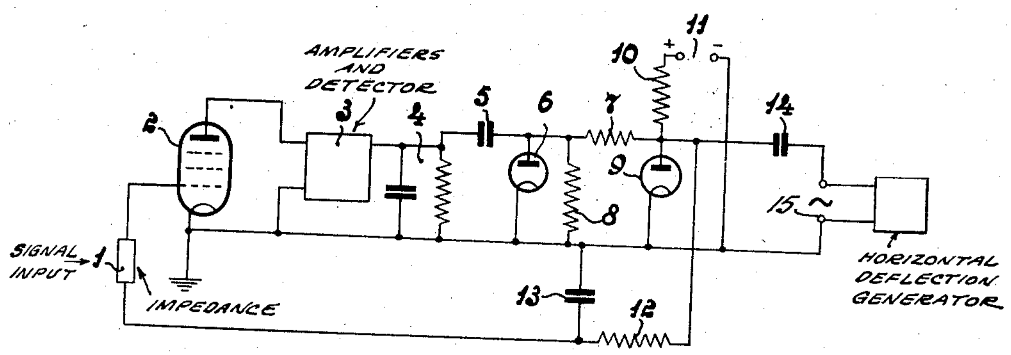
INVENTOR
PETER JOHANNES HUBERTUS JANSSEN
BY Fred M. Vogel
AGENT 2,851,524

AUTOMATIC GAIN CONTROL FOR TELEVISION RECEIVERS

Peter Johannes Hubertus Janssen, Emmasingel, Eindhoven, Netherlands, assignor, by mesne assignments, to North American Philips Company, Inc., New York, N. Y., a corporation of Delaware Application March 28, 1955, Serial No. 497,279
Claims priority, application Netherlands April 24, 1954
3 Claims. (Cl. 178—7.3)

The invention relates to a receiving apparatus, more particularly to television receiving apparatus, in which provision is made of means to obtain a direct voltage increasing in a negative sense with an increase in signal strength. Such apparatus are generally known. This direct voltage is used to obtain automatic gain control, and to this end it is supplied as a bias voltage to the control-grids of one or more high-frequency and/or intermediate-frequency amplifying tubes employed in the apparatus for amplification. It is, in general, obtained by rectification from the intermediate-frequency signal voltage.

It is also known to obtain a so-called delayed automatic gain control, i. e. an automatic gain control which does not become operative until the signal voltage exceeds a particular value, by supplying the said direct voltage through a high-resistance resistor to the anode of a diode, which has an anode bias voltage such that the diode is conductive as long as the first-mentioned direct voltage lies, in the absolute value, below a particular threshold value. The control-voltage proper is obtained, in this case, from the anode of the diode and therefore does not vary substantially as long as the signal voltage has a comparatively low value. With higher values of the signal voltage and hence with a higher absolute value of the direct voltage, the diode is cut off and a control-voltage is obtained which increases with an increase in the signal.

As long as the said diode is conductive, the anode voltage will be substantially equal to the cathode voltage. In general, the cathode of the diode is connected to earth and in order to obtain a constant bias voltage at the grids of the controlled tubes the cathode lead of each of these tubes comprises the parallel combination of a resistor and a capacitor.

Particularly with television receivers, in which oscillations of very high frequencies must be amplified, it is not always possible to employ in this manner constant grid bias voltages. The invention has for its object to provide a circuit arrangement in which the required bias voltage, which is about 1.5 v., may be obtained in a different, very simple manner.

By way of example, a receiving apparatus is taken in which provision is made of the means described above for obtaining a direct voltage increasing in a negative sense with an increase in signal strength, this direct voltage being supplied through a high-resistance resistor to a point, to which the grids of one or more high-frequency and/or intermediate-frequency amplifying tubes are connected conductively, so that at this point there occurs a control-voltage which keeps the amplified signal voltage at a substantially constant value, whilst this point is furthermore connected to the anode of a rectifier, which has an anode bias voltage such that the rectifier is conductive as long as the first-mentioned direct voltage lies in the absolute value below a particular threshold value, so that only a low control-voltage or a variation of the control-voltage can occur, whereas at higher values of the direct voltage the diode is cut off.

According to the invention a constant alternating voltage is, in addition, operative at the anode of the diode, so that in the first case, i. e. with low signal voltages, a definite constant negative bias voltage is operative at the grids of the said tubes.

The said constant alternating voltage may, in a television receiver, be derived for example from the generator for the horizontal deflection voltages; in this case simple smoothing means may suffice.

It should be noted that a receiving apparatus is known, in which by means of a diode, across the circuit of which an alternating voltage obtained from the mains is operative, a threshold voltage is derived for the detector circuit, so that the detection occurs only when the signal voltage exceeds a particular value. In this case a control-voltage for the automatic gain control is also derived from the detected voltage and the diode supplies a constant bias voltage for the grids of the controlled tubes, the cathodes of which may consequently be directly connected to earth. In this known arrangement provision is made of a single rectifier for deriving the control-voltage and the modulation voltage. Therefore the connection of the said diode differs from that of the apparatus according to the invention.

In the latter case provision is preferably made of two separate rectifiers, of which one serves to derive the first-mentioned direct voltage and the second is used for the conventional detection.

The invention will now be described more fully with reference to a drawing, in the single figure of which that part of the circuit arrangement is shown as far as is important for a good understanding of the invention. It is assumed that the high-frequency signal oscillations are fed to an impedance 1 and amplified in a high-frequency amplifying tube 2. To the control-grids of this tube is supplied a control-voltage. The derived control-voltage may be operative at control-grids of a plurality of tubes.

The amplified signal oscillations are fed to a device 3, which may include a plurality of amplifying stages (high-frequency and intermediate-frequency stages) and a first detector. Across the circuit 4 occurs an intermediate-frequency voltage, from which the control-voltage is derived. It should furthermore be noted that the manner in which the control-voltage is derived, is of little importance for the invention. As well as the cathode of the amplifying tube 2, the circuit 4 is unilaterally connected to earth. The other side of the circuit is connected through a capacitor 5 to the anode of a diode 6, the cathode of which is also connected to earth. This diode serves to obtain a retified voltage, from which the control-voltage proper is derived.

The anode of the diode 6 is connected through a high-resistance resistor 7 to the anode of a second diode 9, the cathode of which is connected to earth. A resistor 8 constitutes a direct-current path parallel to the diode 6. The anode of the diode is moreover, connected through a high-resistance resistor 10 to the positive terminal of a direct-voltage source, the negative terminal of which is connected to earth. Thus the diode 9 has a definite anode bias current, so that the diode is conductive, when the signal voltage is comparatively low. From the anode of the diode 9 is, moreover, derived the control-voltage for the tubes through a resistor 12. The capacitor 13 serves for smoothing purposes.

The device described so far is known per se. Owing to the high-resistance resistor 7 the voltage at the anode of the diode 9 cannot, at a low signal amplitude, follow that of the anode of the diode 6, since the diode 9 is yet conductive. The voltage at the anode of the diode 9 is substantially equal to that of the cathode. If no further measures were taken, the first control-grid of the tube 2 would also be at earth potential. At higher signal voltages, the anode of the diode 9 becomes negative, so that the diode is cut off and the variation of voltage at the anode at a further increase in signal amplitude is equal to the variation of the voltage at the anode of the diode 6. It is assumed in this case that the resistor 10 has a high value of resistance with respect to the resistor 7. At higher signal amplitudes a control-voltage is thus operative at the grids of the controlled tubes.

In order to ensure that at a low signal amplitude a constant grid bias voltage prevails, an alternating-current source 15, for example the secondary winding of the transformer for the horizontal deflection voltages is, in accordance with the invention, connected through a capacitor 14 between the anode and the cathode of the diode 9. The voltage of this alternating-current source is rectified by the diode 9 and serves as a grid bias voltage at all times for the tube 2, whereby the tube 2 has a proper operating bias even when the signal level is too low to cause a control voltage to be produced.

Instead of using the diodes 6 and 9, use may be made of rectifiers of a different kind, for example germanium rectifiers.

What is claimed is:

1. A receiver circuit having automatic gain control, comprising at least one amplifying stage having an input electrode and an output circuit, a source of signals connected to said input electrode, means connected to said output circuit to provide a control voltage which increases in a negative sense with an increase in signal strength, a rectifier having an anode and a cathode, a resistor, means connected to apply said control voltage through said resistor to said anode, biasing means comprising a D.-C. voltage source and a resistance connected in series between said anode and said cathode to cause said rectifier to be conductive when the absolute value of said control voltage lies below a threshold value and to cause said rectifier to become cut-off when the absolute value of said control voltage lies above said threshold value, a source of alternating voltage connected between said cathode and said anode, and means electrically connecting said input electrode to said anode.

2. A receiver circuit as claimed in claim 1, in which said means to provide a control voltage comprises a second rectifier having anode and cathode electrodes, and means for feeding the signal from said output circuit to one of the electrodes of said second rectifier, the anode of said second rectifier being connected through said resistor to the anode of the first-named rectifier, and said cathodes being connected together.

3. A receiver circuit as claimed in claim 1, said receiver circuit being included in a television receiver which comprises a horizontal deflection generator, and in which said source of alternating voltage comprises said horizontal deflection generator.

References Cited in the file of this patent

UNITED STATES PATENTS 2,135,560 Carlson ---------------- Nov. 8, 1938